Sept. 13, 1955  R. L. HOLCOMBE  2,717,459
FLIGHT INSTRUCTION APPARATUS
Filed April 4, 1952  4 Sheets-Sheet 1
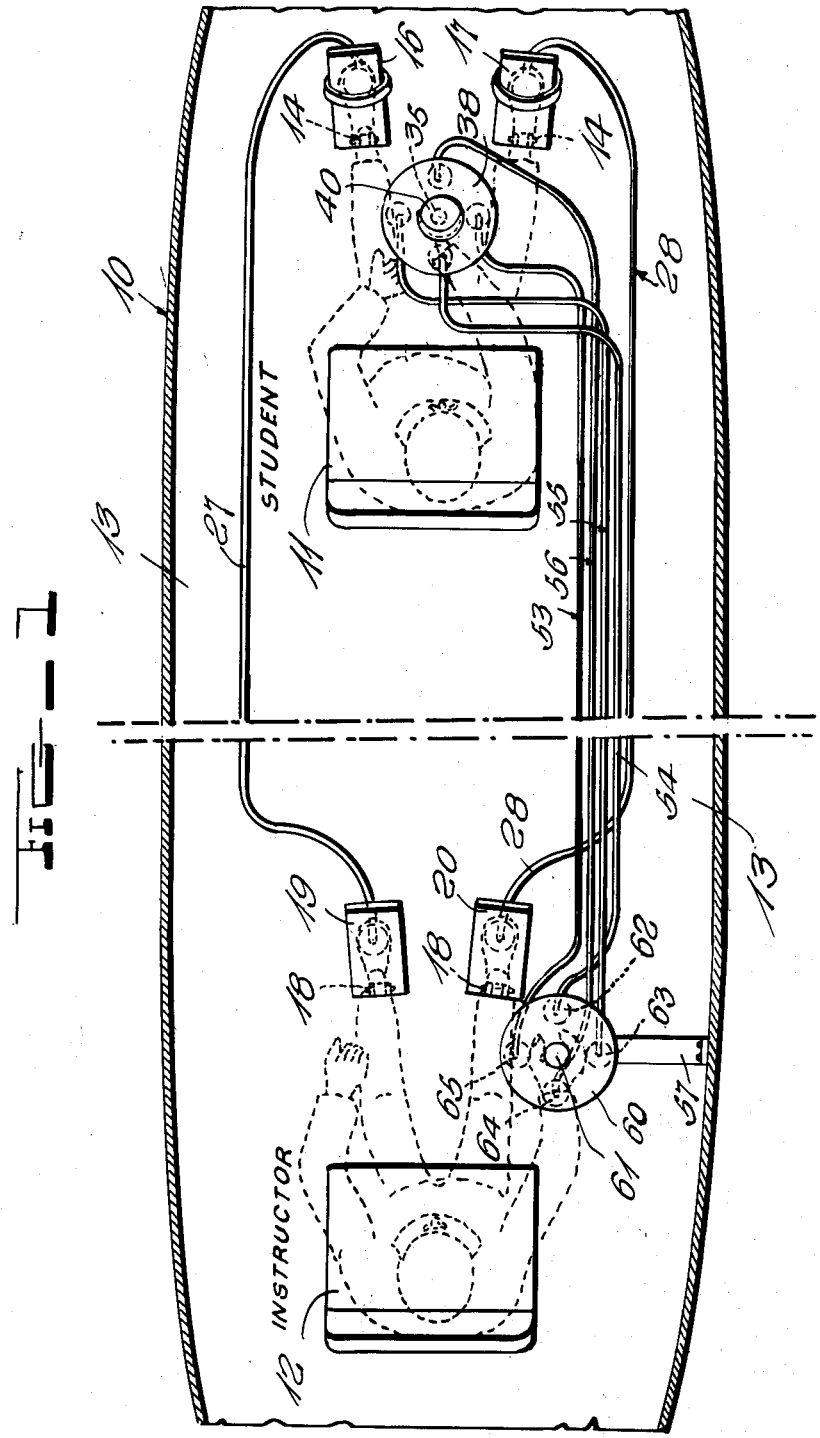
INVENTOR
RALPH LYMAN HOLCOMBE,
BY
ATTORNEY

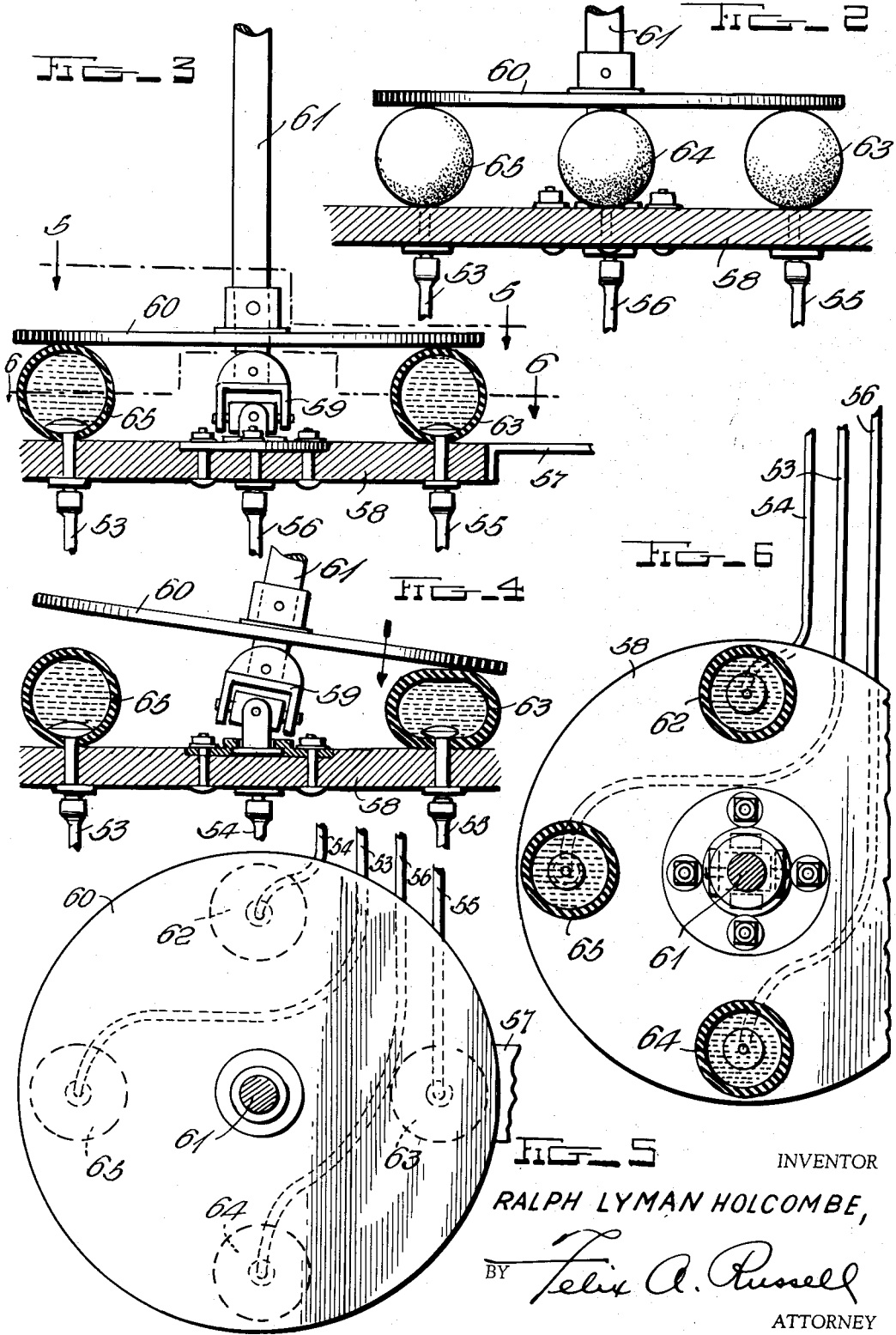

Sept. 13, 1955 — R. L. HOLCOMBE — 2,717,459
FLIGHT INSTRUCTION APPARATUS
Filed April 4, 1952 — 4 Sheets-Sheet 3
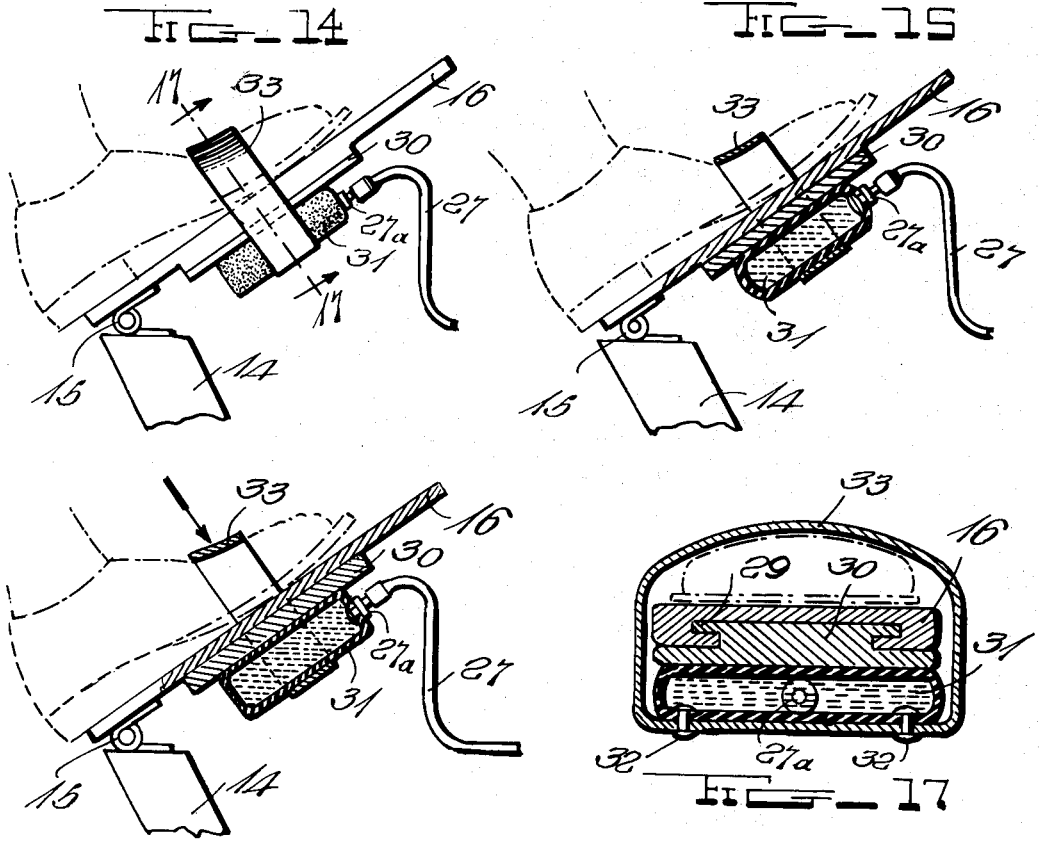
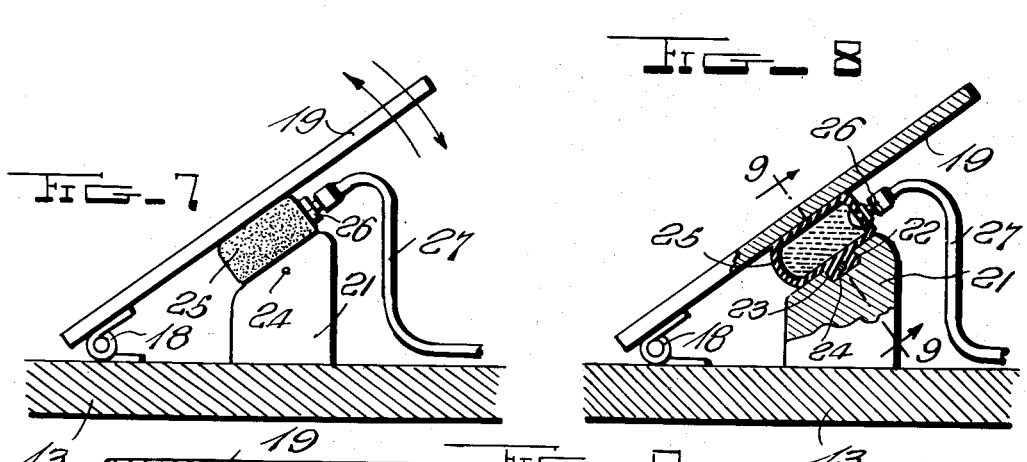
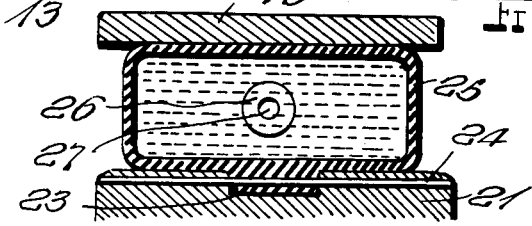
INVENTOR
RALPH LYMAN HOLCOMBE,
BY Felix A. Russell
ATTORNEY

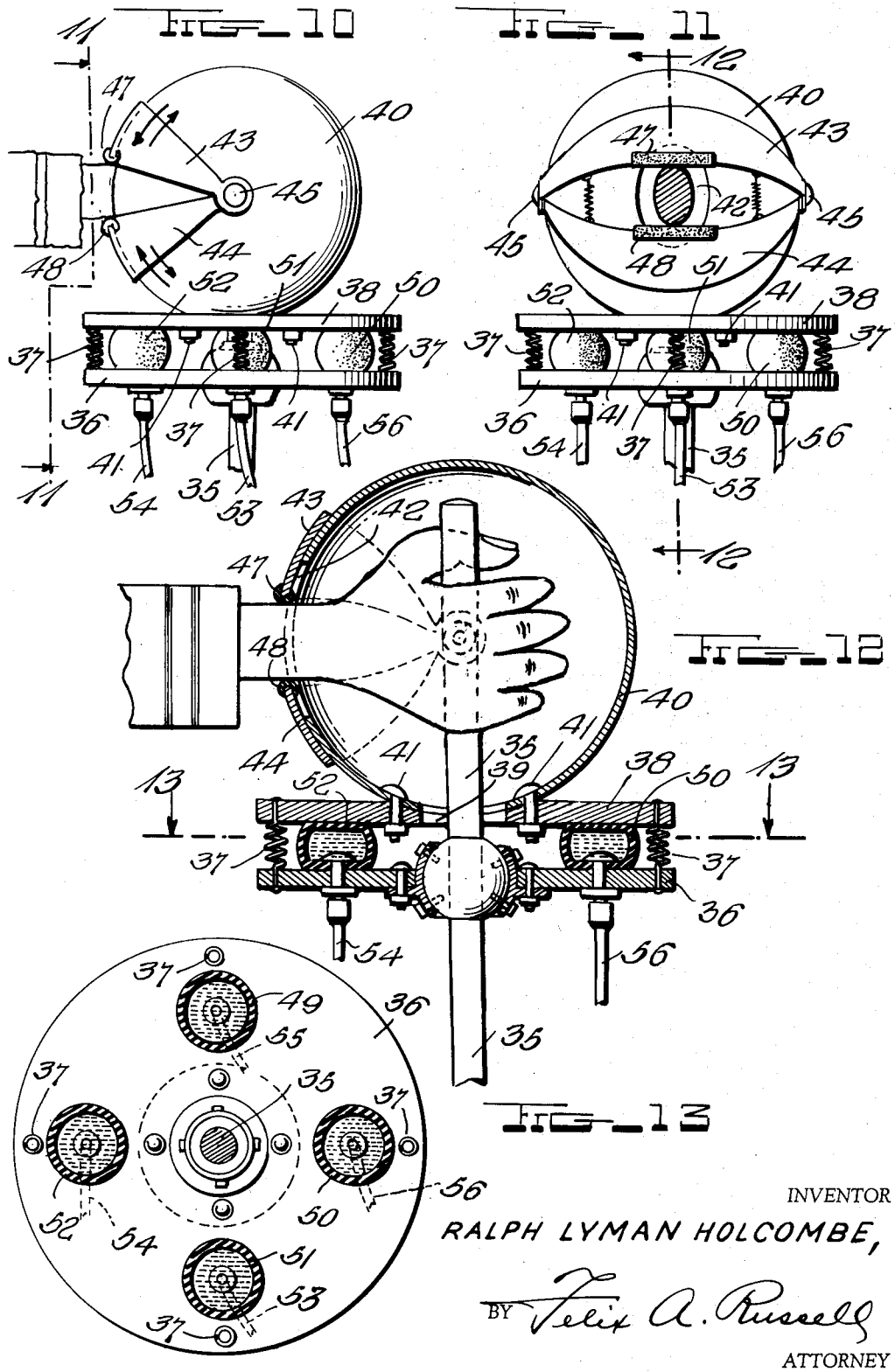

United States Patent Office 2,717,459
Patented Sept. 13, 1955

2,717,459

FLIGHT INSTRUCTION APPARATUS

Ralph Lyman Holcombe, Ada, Okla.

Application April 4, 1952, Serial No. 280,580

9 Claims. (Cl. 35—12)

The present invention relates to a flight instruction apparatus and it consists in the combinations, constructions and arrangements of parts herein described and claimed.

Generally there is provided a flight instruction apparatus which is particularly adapted to be installed in an airplane of the conventional student's type wherein a student is seated in such airplane and actually handles all of the controls for guiding the plane in flight, take offs and landings and in which airplane there is provided a seat to the rear of the student's seat in which an instructor sits in a position where he may observe all the movements of the student pilot so that he may instruct and advise him. The present improvement in the art consists of a set of controls accessible to the instructor and which controls are mounted upon the conventional devices such as pedals and control lever in such manner as to not interfere with or move in any way the controls of the student but which at the same time act to give the student sensory warnings or suggestions. These devices are controlled by fluid pressure means operable by the instructor from his seat in the air craft and are such that they impart to that hand of the student which is upon the control lever a pulling or pushing movement upon such hand in the direction desired by the instructor. Likewise, at the will of the instructor a strap encircling the forward part of each foot of the student may be caused to urge either of such feet in a forward and downward direction to thus indicate to the student that he should make a corresponding movement with such foot, it being understood, however, that the apparatus under the control of the instructor in no way actually moves the conventional controls of the aircraft being flown by the student. The apparatus contains many novel features which will be brought out hereinafter.

It is accordingly an object of the invention to provide a novel flight instruction apparatus having novel means controllable by an instructor for imparting sensory perceptions to a student without interfering with the student's control of an aircraft in which the apparatus may be installed.

Another object of the invention is to provide, in an apparatus of the character set forth, novel transmission means between an instructor's controls and a student's controls, both controls forming a part of the apparatus of the invention.

Another object of the invention is to provide, in an apparatus of the character set forth, a novel student's control hand encompassing member forming a part of the invention.

A further object of the invention is the provision, in an apparatus of the character set forth, of novel means whereby varying portions of two movements may be simultaneously indicated by an instructor to a student using the apparatus.

Another object of the invention is to provide an apparatus of the character set forth which is simple in construction, inexpensive to manufacture and yet effective and efficient in use.

A further object of the invention is the provision, in an apparatus of the character set forth, of a novel pedal-attached signalling device having means whereby the same may not interfere with the normal operation of the pedal to which it is attached.

Other and further objects of the invention will become apparent from a reading of the following specification taken in conjunction with the drawings, in which:

Figure 1 is a plan view, partly broken away, of an embodiment of the invention shown mounted in an airplane, Figure 2 is a fragmentary elevational view of an instructor's hand control forming a part of the invention, Figure 3 is a view similar to Figure 2 but partly in section and showing the device of Figure 2 in normal position, Figure 4 is a view similar to Figure 3 but showing the device in signalling position, Figure 5 is a sectional view taken along line 5—5 of Figure 3, Figure 6 is a sectional view taken along line 6—6 of Figure 3, Figure 7 is a side elevational view of an instructor's foot signalling device forming a part of the invention, Figure 8 is a view similar to Figure 7 but partly broken away to show certain details of construction, Figure 9 is an enlarged fragmentary sectional view taken along line 9—9 of Figure 8, Figure 10 is a side elevational view of a student's hand signal receiving device forming a part of the invention, Figure 11 is a sectional view taken along line 11—11 of Figure 10, Figure 12 is an enlarged sectional view taken along line 12—12 of Figure 11, Figure 13 is a sectional view taken along line 13—13 of Figure 12, Figure 14 is a side elevational view of a foot signal receiving device forming a part of the invention and shown in normal position upon a conventional pedal of an airplane, Figure 15 is a view similar to Figure 14 but partly in section to show details of construction, Figure 16 is a view similar to Figure 15 but showing the device in signalling condition, and Figure 17 is an enlarged sectional view taken along line 17—17 of Figure 14.

Referring more particularly to the drawings, there is shown therein an airplane generally designated at 10 and having mounted therein a student's seat 11 and, rearwardly thereof, an instructor's seat 12. The aircraft is provided with a floor 13.

Forwardly of the student's seat 11 there extends through the floor 13 in conventional manner the usual rudder control levers 14 at the upper ends of which there is pivoted, as indicated at 15, a left rudder pedal 16 and a right rudder pedal 17.

Forwardly of the instructor's seat 12 there is pivoted to the floor 13, as indicated at 18, an instructor's left foot pedal 19 and an instructor's right foot pedal 20. Beneath each of the pedals 19 and 20 is a block 21 each of which is provided with a recess 22 in its upper face in which recess is positioned a base member 23 of solid rubber or like material. The base 23 is affixed in the recess 22 in each case by a transverse pin 24. Integrally formed with the upper face of the base 23 is a bulb 25 of flexible rubber or like material and the bulbs 25 are each provided with a fitting 26 which, in the case of the bulb beneath the left pedal 19 has attached thereto one end of a tube 27 and, in the case of the bulb 25 beneath the right pedal 20, has connected thereto a tube 28.

Each of the pedals 16 and 17 is provided on its underside with a longitudinally extending trackway 29 in which is slidably keyed a plate 30, and to the underside of each plate 30 there is affixed in any suitable manner a bulb 31. The tubes 27 and 28 connect, respectively, by suitable fittings 27a with the bulbs 31 beneath the student's pedals 16 and 17. Each of the bulbs 31 has affixed to its underside, as by rivets 32 a foot-encircling strap 33 and 34, respectively, for the pedals 16 and 17.

A conventional control stick 35 is positioned in the aircraft 10 in front of the student's seat 11 and has affixed thereto adjacent its upper end a circular platform 36 and connected to the platform in spaced vertical relation by means of a plurality of tension springs 37 is a disc 38 having a central aperture 38 therein, the upper portion of the stick 35 extending freely through the aperture 39.

A spherical casing 40 is affixed to the upper side of the disc 38 by bolts 41 or the like and is provided at its lower end with an opening which registers with the opening 39. The casing 40 encompasses that portion of the stick which extends upwardly through the opening 39 and is provided upon that side thereof which faces the student's seat 11 with a hand-receiving opening 42.

Upper and lower wrist-gripping members 43 and 44 each have their ends pivotally connected to the lateral sides of the casing 40, as indicated at 45, and the upper member 43 is centrally provided upon its lower edge with a pad 47 while the lower member is centrally provided on its upper edge with a pad 48.

Affixed to the upper face of the platform 36 in spaced circumferential relation are four bulbs 49, 50, 51 and 52, each of which bears against the underside of the disc 38 and each of which is provided with suitable fittings which extends through the platform 36 and connect with the tubes 55, 56, 53 and 54 respectively.

Affixed to the aircraft 10 at any convenient place adjacent the instructor's seat 12 as by a bracket 57 is a platform 58 to the upper side of which is connected in vertically spaced relation by means of a universal joint 59 a disc 60 having a centrally disposed upwardly extending controlling stick 61 affixed thereto.

Four bulbs 62, 63, 64 and 65 are affixed to the upper face of the platform 58 in circumferentially spaced relation and each is adapted to normally bear against the underside of the disc 60 and each is provided with a suitable fitting which extends through the platform 58 to connect, respectively, with the tubes 54, 55, 56 and 53. All of the bulbs and all of the tubes are filled with a conventional and suitable hydraulic fluid.

In operation, it will be apparent that a student will fly the aircraft 10 and will be seated in the student's seat 11 while his instructor will be seated in the instructor's seat 12 where the instructor may observe the student's actions in controlling the aircraft and particularly the attitude of the aircraft.

It will also be apparent that should the instructor observe the need for additional pressure by the student upon his left rudder 16, he may indicate this to the student by pressing upon his own left rudder 19. This action will cause the compression of the bulb 25 thus communicating through the fluid contained in the bulb 25, tube 27 and bulb 31 to cause an expansion of the bulb 31 associated with the pedal 16. This action will cause a constricting action to take place upon the student's left foot by means of the downward movement of the strap 33 while in no way affecting the actual movement of the pedal 16 since the bulb 31, the strap 33 and plate 30 are all carried by the pedal 16. The constricting movement, however, will indicate to the student that he should move his left foot forwardly. It should be clearly understood that in all of the actions to be hereinafter described, wherever the instructor moves his controls it merely indicates to the student what the student is to do but does not do it for him.

Again, if the instructor should observe that the student ought to move his right rudder pedal 17 forwardly, he may indicate this fact by pressing upon his right rudder pedal 20 whereupon the identical action will take place as heretofore described with regard to the left pedal 16, the pressure this time being communicated through the tube 28 to the bulb beneath the pedal 17.

Now with regard to aileron and elevator controls, it will be seen that the conventional control stick 35 is under the absolute control of the student at all times. However, should the instructor observe that the student should correct the attitude of the aircraft 10 by moving the control stick 35 forwardly, he will indicate this by moving his own control stick 61 forwardly. This action acts to compress the bulb 62 due to the fact that the disc 60 attached to the stick 61 will bear upon the upper end of the bulb 62 during this action on the part of the instructor, it being apparent, also that the stick 61 is capable of universal movement in any desired direction due to its connection by means of the universal joint 59 with the platform 58.

When the instructor has moved the stick 61 forwardly, as aforesaid, this action is communicated to the bulb 52 which will be expanded to thereby cause a lifting of the rearward portion of the disc 38 and its attached casing 40. This action will cause a forward pulling movement to take place by the pads 47 and 48 in contact with the wrist of that hand of the student which is engaged with the stick 35, thus indicating to the student that he should move his stick 35 forwardly. It will be again understood that the action by the instructor just described will in no way affect the actual movement of the stick 35 since this is under the sole control of the student. However, it will be seen that the forward movement of the casing 40 and the pads 47 and 48 will act to urge the student to make such forward movement of the stick.

Likewise it will be seen that should the instructor desire the student to move his control stick 35 rearwardly, the instructor will move the stick 61 rearwardly which will act to compress the bulb 65 by means of the disc 60 and thus communicate this action through the tube 53 to the bulb 50. This action causes a lifting of the forward end of the platform 38 and a like movement of the casing 40 thus "urging" the wrist of the student in a rearward direction while in no way affecting the actual movement of the stick 35.

Should the instructor desire the student to move the stick 35 to the left, he will indicate this by moving the stick 61 to the left thus compressing the bulb 65 and communicating this action through the tube 53 to the bulb 50 thus to cause a raising of the right side of the platform 38 and a consequent raising of the casing 40 in an upward arcuate movement to the left which causes the right side of the casing 40 to impinge against the rear of the student's hand to thus urge him to move the stick 35 to his left. Finally, should the instructor desire the student to move the control stick 35 to the right, he will move his control stick 61 to the right thus compressing the bulb 63 and through the medium of the tube 53 expanding the bulb 51 to thus cause the left side of the disc 38 to tilt upwardly and to the right carrying the casing 40 in a like direction and thus impinging the left side of the casing 40 against the left hand side of the student's hand to thus urge the student to move his stick to the right.

It will be apparent that in all cases whenever the instructor moves any of his controls 19, 20 or 61, a movement is imparted to the straps 33 or the disc 38 and its attached casing but that in no case is any movement whatever imparted to the actual controls for the aircraft itself. The movements imparted to the devices affecting the student are merely for the purpose of urging him to perform certain actions and it will be apparent that all of these actions are such that the student is "urged" to move in the intended direction.

Referring now to Figures 14 to 17, inclusive, it will be apparent that the feet of the student are allowed free movement longitudinally upon the pedals 16 and 17 due to the fact that the plates 30 are slidably keyed to the undersides of the pedals 16 and 17. This is of importance in allowing freedom of movement to the student upon landing the aircraft since the conventional hydraulic braking system of the aircraft is controllable by means of the pivoting movement forwardly of the pedals. In order to properly give this pivotal forward movement (and not a reciprocal movement to the shafts 14) it is necessary for the student to place his foot as far forwardly as possible. Hence the present apparatus allows such movement while at the same time remaining in effective cooperative relation to the instructor's pedals 19 and 20 as above described.

While but one form of the invention has been shown and described herein, it will be readily apparent to those skilled in the art that many minor modifications may be made without departing from the spirit of the invention or the scope of the appended claims.

What is claimed is:

1. An apparatus of the character described comprising, in combination with an aircraft having a pair of rudder control pedals and a conventional control stick, said pedals and said stick adapted to be moved by the feet and a hand, respectively, of a pilot for said aircraft, the provision of remotely controllable means in said aircraft for tangibly and selectively indicating to said pilot proposed movements of said pedals and control stick, said means including a pair of instructor's foot pedals pivotally mounted in said aircraft, a pair of bulbs each mounted below one of said instructor's pedals for compressive action by the same, a bulb mounted on the underside of each of the rudder pedals, a strap affixed to each of the bulbs carried by said rudder pedals and each adapted to encompass a portion of a foot placed on said pedal, a tube interconnecting each of the bulbs beneath the instructor's pedals with a corresponding bulb of the rudder pedals, and a fluid in each tube and its connected bulbs.

2. An apparatus of the character described comprising, in combination with an aircraft having a pair of rudder control pedals and a conventional control stick, said pedals and said stick adapted to be moved by the feet and a hand, respectively, of a pilot for said aircraft, the provision of remotely controllable means in said aircraft for tangibly and selectively indicating to said pilot proposed movements of said pedals and control stick, said means including a platform affixed to said conventional control stick adjacent the upper end thereof, an apertured disc surrounding said conventional stick in spaced vertical relation to said platform, a hand-receiving casing affixed to said disc and enclosing the upper portion of said conventional stick, four bulbs affixed atop said platform in spaced circumferential relation and each in normal contact with the underside of said apertured disc, and remotely controllable means for selectively expanding said four bulbs.

3. An apparatus as defined in claim 2 wherein said hand-receiving casing is provided with a hand-receiving opening, an upper wrist-gripping member having its ends pivoted to said casing, a lower wrist-gripping member pivoted to said casing, springs interconnecting said wrist-gripping members and adapted to urge the same toward each other, said wrist-gripping members positioned on said casing to move across said opening.

4. An apparatus as defined in claim 3 wherein the central portion of the lower edge of said upper member and the upper central portion of the upper edge of said lower member are each provided with padding.

5. An apparatus as defined in claim 2 wherein said means for selectively expanding said bulbs comprises a platform affixed to said aircraft, an instructor's stick universally connected at its lower end to said platform, four compressible bulbs affixed in spaced circumferential relation to said stick upon said platform and selectively compressible by movement of said instructor's stick, a tube interconnecting each of said compressible bulbs with one of the bulbs carried by said conventional stick, and a fluid in each tube and its connected bulbs.

6. An apparatus of the character described comprising, in combination with an aircraft having a pair of rudder control pedals and a conventional control stick, said pedals and said stick adapted to be moved by the feet and a hand, respectively, of a pilot for said aircraft, the provision of remotely controllable means in said aircraft for tangibly and selectively indicating to said pilot proposed movements of said pedals and control stick, a platform affixed to said conventional control stick adjacent the upper end thereof, an apertured disc surrounding said conventional stick in spaced vertical relation to said platform, a hand-receiving casing affixed to said disc and enclosing the upper portion of said conventional stick, four bulbs affixed atop said platform in spaced circumferential relation and each in normal contact with the underside of said apertured disc, and remotely controllable means for selectively expanding said four bulbs.

7. An apparatus as defined in claim 6 wherein said hand-receiving casing is provided with a hand-receiving opening, an upper wrist-gripping member having its ends pivoted to said casing, a lower wrist-gripping member pivoted to said casing, springs interconnecting said wrist-gripping members and adapted to urge the same toward each other, said wrist-gripping members positioned on said casing to move across said opening.

8. An apparatus as defined in claim 7 wherein the central portion of the lower edge of said upper member and the upper central portion of the upper edge of said lower member are each provided with padding.

9. An apparatus as defined in claim 6 wherein said means for selectively expanding said bulbs comprises a platform affixed to said aircraft, an instructor's stick universally connected at its lower end to said platform, four compressible bulbs fixed in spaced circumferential relation to said stick upon said platform and selectively compressible by movement of said instructor's stick, a tube interconnecting each of said compressible bulbs with one of the bulbs carried by said conventional stick, and a fluid in each tube and its connected bulbs.

References Cited in the file of this patent

UNITED STATES PATENTS

| 1,881,878 | Nidh | Oct. 11, 1932 |
| 2,060,806 | Hunt | Nov. 17, 1936 |
| 2,657,476 | Holcombe | Nov. 3, 1953 |
| 2,682,042 | Harcum | June 22, 1954 |

FOREIGN PATENTS

| 166,543 | Great Britain | July 11, 1921 |
| 372,100 | Great Britain | May 5, 1932 |